United States Patent [19]

Soref

[11] Patent Number: 4,671,604

[45] Date of Patent: Jun. 9, 1987

[54] WAVELENGTH DEPENDENT, TUNABLE, OPTICAL TIME DELAY SYSTEM FOR ELECTRICAL SIGNALS

[75] Inventor: Richard A. Soref, Newton Centre, Mass.

[73] Assignee: The United States of America as represented by the Secretary of the Air Force, Washington, D.C.

[21] Appl. No.: 698,979

[22] Filed: Feb. 6, 1985

[51] Int. Cl.$^4$ .............................................. G02B 6/28
[52] U.S. Cl. ........................ 350/96.15; 250/227; 350/96.18; 350/96.29; 370/1
[58] Field of Search ............... 350/96.15, 96.16, 96.18, 350/96.19, 96.20, 96.29, 96.30; 250/227; 370/1, 3; 455/610, 612

[56] References Cited

U.S. PATENT DOCUMENTS

| | | | |
|---|---|---|---|
| 3,528,072 | 9/1970 | Pickering | 343/754 |
| 3,781,722 | 12/1973 | Pierson | 333/31 R |
| 3,878,520 | 4/1975 | Wright et al. | 343/854 |
| 3,991,417 | 11/1976 | Levine | 343/7.7 |
| 4,028,702 | 6/1977 | Levine | 343/100 SA |
| 4,150,287 | 4/1979 | Perkins | 250/226 |
| 4,164,373 | 8/1979 | Schuss et al. | 356/316 |
| 4,240,696 | 12/1980 | Tracy et al. | 350/163 |
| 4,258,363 | 3/1981 | Bodmer et al. | 343/16 R |
| 4,270,847 | 6/1981 | Meyer | 350/392 |
| 4,425,633 | 1/1984 | Swain | 365/194 |
| 4,429,954 | 2/1984 | Caulfield et al. | 350/3.64 |
| 4,558,449 | 12/1985 | Gordon | 372/26 X |

OTHER PUBLICATIONS

Tsang, W. T. et al., "High-Speed Direct Single-Frequency Modulation with Large Tuning Rate and Frequency Excursion in Cleaved-Coupled-Cavity Semiconductor Lasers," *Applied Physics Letters*, vol. 42, No. 8, Apr. 15, 1983, pp. 650–656.
Sheehan, P. G. et al., "The Use of Optical Techniques for Beamforming in Phased Arrays," *SPIE*, vol. 477, 1984, pp. 82–89.
Popa, Adrian E., "Fiber Optics Implications for Radar Equipment Design," *Electro–81 Conference Record*, New York, New York, Apr. 7-9, 1981, pp. 1–6.
Tsang, W. T. et al., "1.5 μm Wavelength GaInAsP C$^3$ Lasers: Single-Frequency Operation and Wideband Frequency Tuning," *Electronics Letters*, vol. 19, No. 11, May 26, 1983, pp. 415–417.
Chang, I. C., "Acousto–Optic Tunable Filters," *Acousto-Optic Signal Processing: Theory and Implementation*, N. J. Berg and J. N. Lee, Editors, Marcel Dekker, New York, 1983, pp. 139–159.
Advertisement by Interactive Radiation Inc., Northvale, N.J.

*Primary Examiner*—John Lee
*Attorney, Agent, or Firm*—Jacob N. Erlich; Donald J. Singer

[57] ABSTRACT

A wavelength dependent, tunable, optical time delay system for electrical signals having a conversion/tuning unit for converting an incoming electrical signal into an optical signal as well as selectively varying the wavelength of the optical signal; a single-mode, high dispersion optical fiber for receiving the optical signal and through which the optical signal propagates at a speed dependent upon its wavelength; and a detector/converter for converting the optical signal back to an electrical signal. By utilizing a separate preselected electronic control-signal fed to the conversion/tuning unit, the wavelength of the optical signal entering the fiber can be varied over a preselected wavelength band of interest. By selectively varying the wavelength of the optical signal, the electrical signal can be effectively and rapidly time delayed as desired in response to the electronic signal.

16 Claims, 4 Drawing Figures

WAVELENGTH DEPENDENT, TUNABLE, OPTICAL TIME DELAY SYSTEM FOR ELECTRICAL SIGNALS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to time delay systems, and, more particularly, to a tunable, optical, time delay system for electrical signals which converts these electrical signals into optical signals in order to provide a wavelength dependent time delay.

There are numerous electronic devices and components in which it is desirable to utilize an electronic signal which has been delayed in time by a prescribed and controllable amount. A controlling signal is used to select the delay. Heretofore the time delaying of electrical signals has been accomplished by several methods including (1) the switching-in of different lengths of coaxial cable in the manner described in U.S. Pat. No. 3,781,722; and (2) the operation of electronic circuit components such as integrated circuits, discrete transistors, and charge-coupled devices.

Some of the more commonly referred to delay circuits include: (1) the multivibrator delay circuit in which a cathode-coupled or emitter-coupled monostable multivibrator may be used as an approximately linear delay circuit; (2) a linear time delay circuit which makes use of a linear saw tooth generator, such as the boot strap or Miller integrator, whose output is compared with a calibrated DC reference voltage level; (3) a circuit that combines the functions of a gate waveform generator, a clamp, and a linear saw tooth generator; and (4) a circuit that combines the Miller integrator saw tooth generator with the gating function and wherein the output is applied to a comparator in a complete linear time delay circuit.

Unfortunately the deficiencies of the prior art electronic delay circuits are numerous. For example, the coaxial devices are bulky and suffer from attenuation and distortion at high frequencies. The electronic devices have cost and complexity factors which markedly increase as the signal bandwidth and/or frequency go up to 1 GHz and beyond. In fact, in some cases the signal amplitude may be adversely affected, and equalization systems or circuits may also be required. The delays in such electronic circuits are many times selected with a potentiometer, rather than being under computer control. In the charge-coupled device approach, very complicated clocking networks are required which cause a considerable drawback. In the SAW devices it is extremely difficult to alter the delay factor. Generally in all such electronic time delay circuits, it is difficult to obtain ultra short delays in the 0.05 ns range. Furthermore, without using free-space propagation, it is difficult to provide remote transmission of the delay signal.

Consequently, and as is clearly evident by the above analysis of such electronic time delay devices, the prior art electronic devices do not satisfy the simultaneous requirements of compactness, simplicity, remote "invulnerable" transmission, multi-gigahertz bandwidth, constant amplitude, cost effectiveness, ultra short delays, numerous delay steps, low-power computer control and rapid updating of delay that is generally required in some of the newer "optical/microwave" systems. One such new application of electrical time delay circuits can be found in the optical/microwave phased-array antenna. In such a hybrid antenna there are stringent requirements of computer-control, viable coupling and, of course, variable delay devices for steering the radiation beam. Furthermore, rapid changes in beam pointing direction are desirable, and such a factor imposes a rapid transition time on the programmable devices incorporated therein. In fact, transition times as short as 1 ns are desirable, although 0.01 to 10 microseconds would be acceptable in some cases. Furthermore, there are instances in which bandwidth of at least 2 GHz is needed, together with discrete accurate control of the time delay. Furthermore approximately 100 equal steps of delay per device is frequently required, with the minimum step being about 0.05 ns. In conjunction with all of the above requirements it is generally conceded that the control power should be less than 0.05 watts. As is clearly evident from the above explanation of the prior art electronic devices, such purely electronic time delay circuits fall short in requirements for the new "optical/microwave" systems in use today and in the future.

SUMMARY OF THE INVENTION

The present invention overcomes the problems of past electronic time delay circuits as set forth in detail hereinabove by providing a tunable (i.e., current-controlled or voltage-controlled) optical time delay system for electrical signals. By converting the electrical signals into an optical signal, the time delay can be dependent upon the particular wavelength of the optical signal. Furthermore, by relying upon an optical signal, the time delay system of the present invention is capable of providing extremely short time delays of, for example, 10 ps to 100 ps, and includes the capability of remote transmission of the delayed signals over optical fibers.

The optical time delay system of the present invention incorporates therein a conversion unit capable of converting the incoming electrical signal into an optical signal whose wavelength can be varied over a specific wavelength band of interest. This electro-optical conversion unit is preferably in the form of an optical source such as the $C^3$ semiconductor laser that operates in any one of several longitudinal modes. Consequently the output from the conversion unit is a stable, single frequency oscillation in any one of a plurality of wavelength lines in a group centered at 1490 nm over a range of 30 nm. The output wavelength can be varied as rapidly as 7 ns by supplying current steps of about 3 mA to the wavelength lead of the $C^3$ semiconductor laser. In another embodiment of the present invention this conversion unit may take the form of a broadband optical source such as a super-radiant diode which has its output fed into a fast, narrow band voltage-tunable optical filter.

In both embodiments, the output from the conversion unit is fed into a high-dispersion single-mode optical fiber. At the other end of the high-dispersion single mode optical fiber, and coupled thereto, is a second conversion unit in the form of a photodiode detector which is capable of reconverting the optical signal to the microwave or electrical signal. By transmitting the optical signal through the high-dispersion single-mode fiber, the transit time of the signal through the fiber will have different values that depend upon the wavelength of the signal. Consequently one can obtain total delays of about 450 ps per km of fiber at the 1.5 micrometer wavelength, or of 2400 ps per km of fiber at 0.85 micrometers.

Utilizing the $C^3$ laser as the conversion unit offers approximately 15 to 20 equal steps of time delay with a switching time of about 7 ns between steps. Utilizing the super-radiant diode and fast, narrow band voltage-tunable optical filter as the conversion unit offers about ten steps of time delay, with switching times in the microsecond range. To get a larger number of delay steps, the tunable optical time delay system of the present invention can be combined in an optical series arrangement with another wavelength dependent tunable time delay system of the present invention or combined with the time delay system for electrical signals as set forth in U.S. patent application Ser. No. 698,977, (now U.S. Pat. No. 4,671,605) entitled "Length Dependent, Optical Time Delay/Filter Device for Electrical Signals" filed on the same date as this invention by the present inventor, or the present invention may be combined with the time delay system for electrical signals as set forth in U.S. patent application Ser. No. 698,721 entitled "Mode Dependent, Optical Time Delay System for Electrical Signals" also filed on the same date as this invention by the present inventor together with A. Yang and R. Payne.

It is therefore an object of this invention to provide an electronically controlled (tunable) optical time delay system for electrical signals which incorporates therein a series of optical components in order to rely upon wavelength variations for its tunability.

It is another object of this invention to provide a wavelength dependent tunable optical time delay system for electrical signals which can generate "true time delays" in the 10 to 150 ps range.

It is still another object of this invention to provide a wavelength dependent tunable optical time delay system for electrical signals in which the time delay can be easily and reliably achieved.

It is further object of this invention to provide a wavelength dependent tunable optical time delay system for electrical signals in which the switching times are extremely fast.

It is still a further object of this invention to provide a wavelength dependent tunable optical time delay system for electrical signals which can be readily incorporated within other optical systems.

It is an even further object of this invention to provide a wavelength dependent tunable optical time delay system for electrical signals which is extremely simple in its structural configuration.

It is still another object of this invention to provide a wavelength dependent tunable optical time delay system for electrical signals which is economical to produce and which utilizes conventional, currently available components that lend themselves to standard mass production manufacturing techniques.

For a better understanding of the present invention, together with other and further objects thereof, reference is made to the following description taken in conjunction with the accompanying drawings and its scope will be pointed out in the appended claims.

DETAILED DESCRIPTION OF THE PREFERRED EMBODIMENTS

Figure 1:
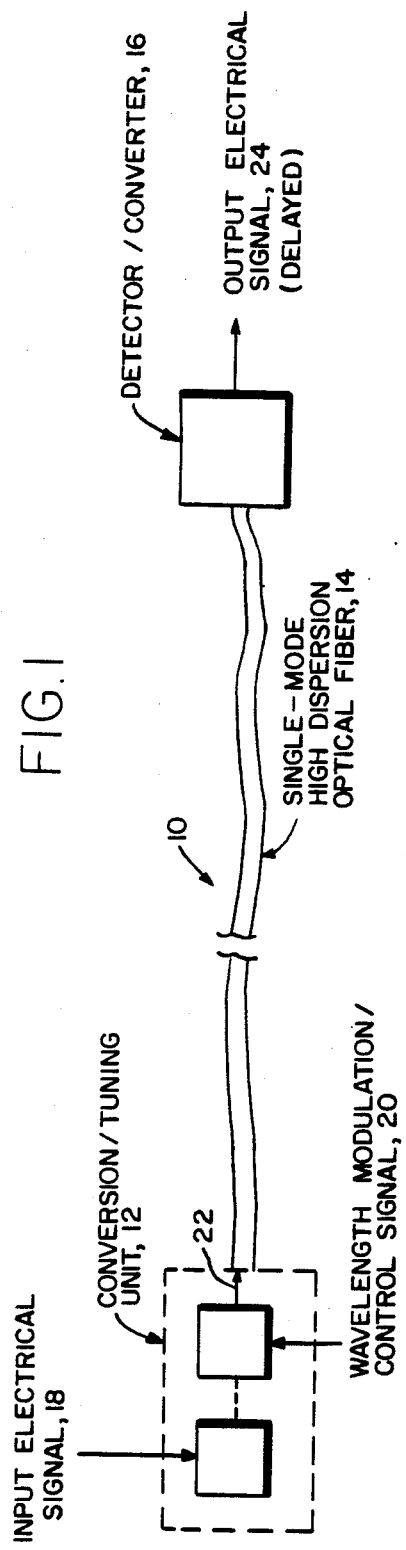
FIG. 1 is a schematic illustration of the wavelength dependent tunable optical time delay system for electrical signals of the present invention.

Reference is now made to FIG. 1 of the drawings which schematically illustrates the wavelength dependent tunable optical time delay system for electrical signals 10 of the present invention. Optical time delay system 10 is made up of three major components, (1) a conversion/tuning unit 12; (2) a single-mode, high dispersion optical fiber 14; and (3) a detector/converter 16.

More specifically, and still referring to FIG. 1 of the drawings, an input electrical signal 18, which is to be time delayed (that is, delayed in time by a prescribed and controllable amount) is fed into conversion/tuning unit 12. This conversion/tuning unit 12 converts the input electrical "microwave" signal 18 into an optical signal which can, by the application of an input wavelength modulation electrical signal 20, have its wavelength varied or tuned. In other words, the microwave signal 18 produces direct, internal modulation of the source, which produces an intensity-modulated optical output.

Conversion/tuning unit 12 is preferably in the form of what is more commonly referred to as a cleaved coupled cavity laser, that is, a $C^3$ semiconductor laser that operates in any one of several longitudinal modes. More particularly, this $C^3$ semiconductor laser or conversion/tuning unit 12 is capable of obtaining stable, single frequency oscillation in any one of thirteen wavelength lines in a group centered at 1490 nm over a range of 30 nm. A more detailed description of a typical conversion/tuning unit or $C^3$ semiconductor laser 12 of the type utilized in the present invention is provided in the following publications which are incorporated herein: (1) W. T. Tsang et al, "1.5 µm wavelength GaInAsP $C^3$ lasers: single-frequency operation and wideband frequency tuning," *Electronics Letters*, vol. 19, No. 11, May 26, 1983, pgs 415–417 and (2) W. T. Tsang, N. A. Olsson and R. A. Logan, "High speed direct single-frequency modulation with large tuning rate and frequency excursion in cleaved coupled cavity semiconductor lasers," *Applied Physics Letters*, vol. 42, (8), Apr. 15, 1983, pgs 650–656.

In conversion/tuning unit 12 the adjacent modes are separated by 2.3 nm and cross talk is extremely low. By the application of a wavelength modulation signal 20, the output 22 from conversion/tuning unit 12 can be switched as rapidly as 7 ns by supplying current steps of about 3 mA. Simultaneously, output 22 from unit 12 can be intensity-modulated by supplying appropriate current inputs. Output 22 is in the form of an optical signal at various wavelengths. This output 22 is fed into a single-mode, high dispersion optical fiber 14 which is coupled to conversion/tuning unit 12 by any conventional securing method such as microlens coupling, an adhesive bonding technique, or the like.

Continuing with the description of the present invention, it is essential that the single-mode optical fiber 14 be of high dispersion, that is, a single-mode optical fiber which exhibits a large chromatic dispersion over the wavelength band of interest. This is a fiber that is operated well away from its dispersion-minimum. For example, at the 1.5 μm wavelength, the dispersion would be 15 ps/nm km, while at 0.85 pm, the dispersion would be 80 ps/nm km. The propagation loss of fiber 14 must also be very low, that is, approximately 0.2 dB/km at 1.5 μm and 3 dB/km at 0.85 μm. The nm factor in the denominator refers either to the spectral linewidth of the source or conversion/tuning unit 12, or to the spectral spacing of two narrow lines, which is the case in the present invention. Fibers with a higher dispersion can be made on a custom basis.

The novel combining of the above elements or components of the present invention enable the signal 22 as it propagates along fiber 14 to do so at a speed which is proportional to its wavelength. Consequently, as the wavelength is modulated or tuned by wavelength modulation signal 20, the speed at which optical signal 22 traverses fiber 14 varies. More specifically, if a 1.5 μm $C^3$ laser 12 is coupled to fiber 14 it is possible to get a total transient time delay (first mode with respect to the 13th mode) of 450 ps per km of fiber across the spectral range of laser 12. Such a delay is available in 13 equal steps of 35 ps/km. If we were to utilize a $C^3$ laser 12 at 0.85 μm with a 30 nm range, it is possible to get a total delay of 2400 ps per km of fiber Still referring to FIG. 1 of the drawings, signal 22 is output from fiber 14 and received at the opposite end of fiber 14 by a conventional optical detector/converter 16. Detector/converter 16 may be in the form of any suitable, conventional photodiode which is capable of converting the received microwave-modulated optical signal 22 into an equivalent electrical output signal 24 (a high-speed demodulator). Apart from the delay, the reconstituted (output) signal 24 has the same waveform as the original electrical signal 18.

With the time delay system 10 of the present invention it is possible to create the generation of "true time delays" in the 10 to 100 ps range. These delays can be adjusted even further by precision-tailoring the length of fiber 14. Consequently, the input electrical signal 18 is time delayed optically in an extremely fast and effective manner with the $C^3$ semiconductor laser or conversion/tuning unit 12 also capable of providing several milliwatts (CW if desired) of power.

Figure 2:
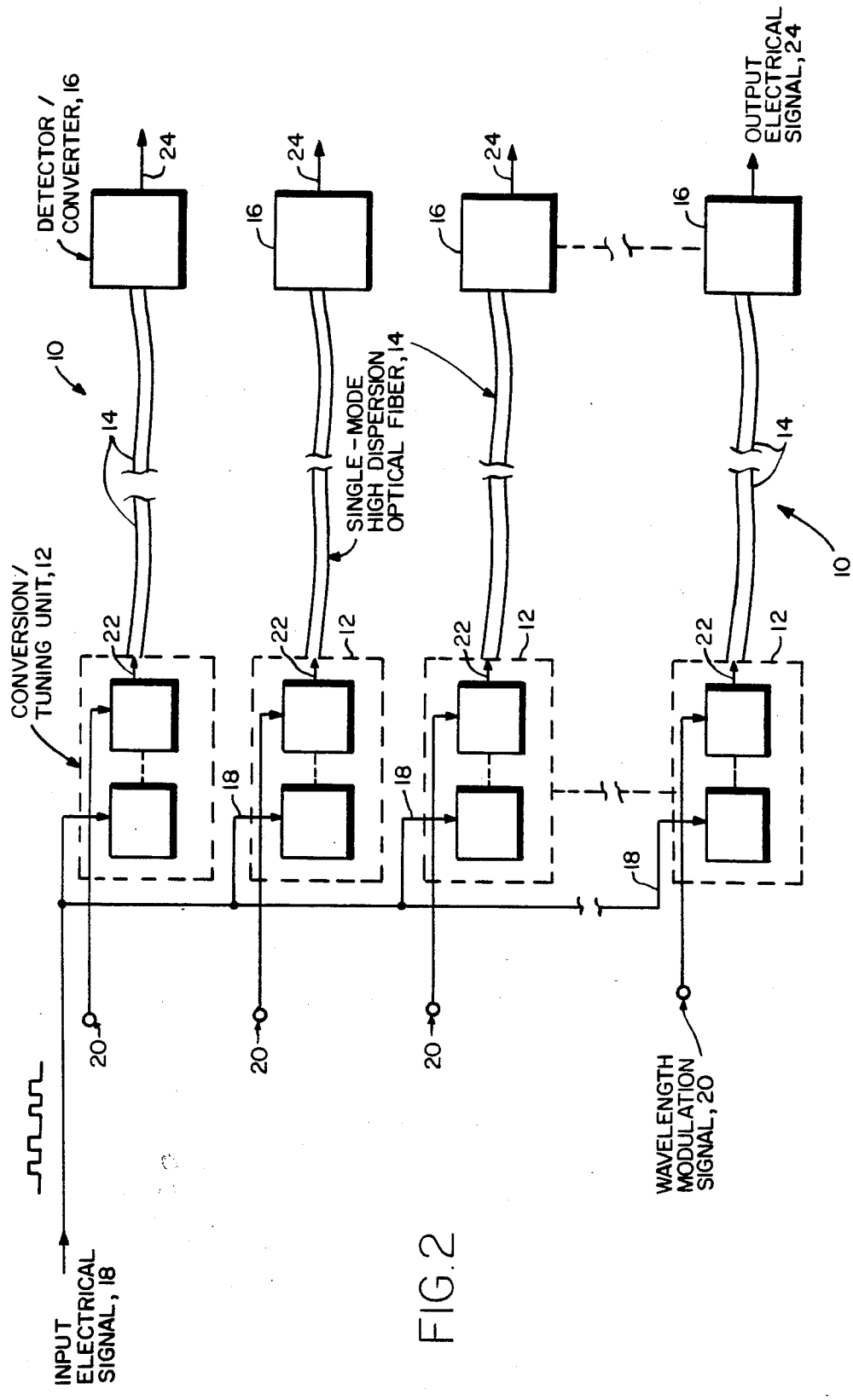
FIG. 2 is a schematic representation of a plurality of such wavelength dependent tunable optical time delay systems of the present invention interconnected with one another to produce a plurality of related outputs.

If desirable, it is also possible with the present invention to link, in parallel fashion, a plurality of time delay systems 10 of the present invention together. This scheme is illustrated schematically in FIG. 2 of the drawings. In this instance, each of the fibers 14 used in each of the systems 10 are of the same lengths and each of the lasers or conversion/tuning units 12 operate at the same wavelengths. By providing a variety of input wavelength modulation signals 20 it is possible to provide several distinct time delays of a single input electrical signal 18 (simultaneous, plural delays), or by providing identical wavelength modulation signals 20 the variety of outputs 24 from the system as illustrated in FIG. 2 would be identical. Furthermore, to get even a larger number of delay steps it is possible to combine each of the optical time delay systems 10 of the present invention with the time delay systems described in U.S. patent application Ser. No. 698,977 and U.S. patent application Ser. No. 698,721, both referred to above and filed on the same date as this invention.

Figure 3:
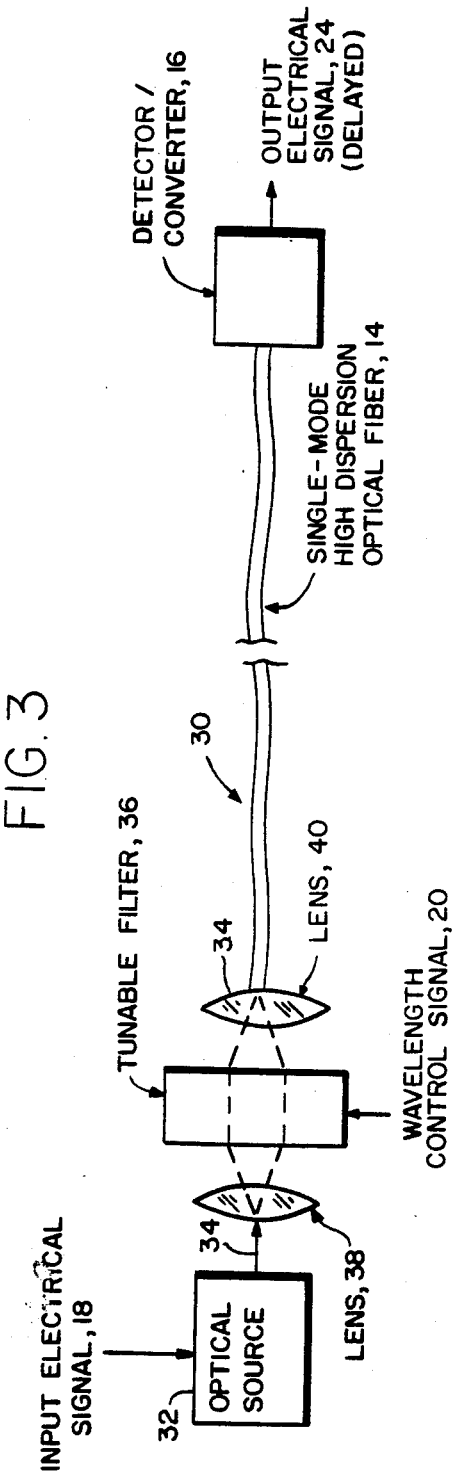
FIG. 3 is a schematic illustration of an alternative embodiment of the wavelength dependent tunable optical time delay system for electrical signals of the present invention.

Reference is now made to FIG. 3 of the drawings which schematically depicts wavelength dependent tunable optical time delay system 30, an alternate embodiment of the present invention. For ease of understanding of optical time delay system 30 as set forth in FIG. 3, elements utilized therein which are similar to those used within optical time delay system 10 set forth in FIG. 1 will be given the identical numerals in all of the Figures. The optical time delay system 30 illustrated in FIG. 3 of the drawings replaces the $C^3$ semiconductor laser conversion/tuning unit 12 as described with reference to FIG. 1 with a pair of components; an optical source 32 for converting the input electrical signal 18 into an optical output 34 and a tunable filter 36 for varying the wavelength of optical signal 34 prior to its passage through the single-mode, high dispersion optical fiber 14. In addition, a pair of lenses 38 and 40 are used to focus and refocus optical signal 34, respectively. Lenses 38 and 40 are generally in the form of quarter pitch grinrods which collimate the divergent source light 34 and refocus it into the core of fiber 14.

More specifically, the optical source 32 is in the form of a superluminescent diode whose 3 dB spectral linewidth is typically 20 nm. Utilization of the superluminescent diode 32 allows lens 38 to collimate signal 34 in tunable filter 36 and refocus signal 34 by lens 40 into the high dispersion, single-mode fiber 14 in a manner described in greater detail hereinbelow. The quasi-coherent nature of the source allows the focal spot diameter to be a few microns for efficient launching into fiber 14.

An example of a superluminescent diode of the type utilized within the present invention would be the super radiant diode, model GOLS-3000, from General Optronics Corporation of Edison, N.J. Such a diode has a 6 mW total output power emitted over the 830 to 850 nm range, centered at 840 nm. The rise time is less than 1 ns, and the diode is made typically from GaAs and GaAlAs. Examples of tunable filter 36 can be found in the following publications: (1) U.S. Pat. No. 4,240,696 issued Dec. 23, 1980, and (2) an advertisement by Interactive Radiation Inc., Northvale, N.J. describing Model Numbers EFL-F20 and EFL-F100.

The operation of the optical time delay system 30 as set forth in FIG. 3 of the drawings is similar to that depicted and explained with reference to FIG. 1 of the drawings. In this embodiment, the input electrical signal 18 enters optical source 32 where it is converted into an optical signal 34 and thereafter is focused onto tunable filter 36. As before, the electrical signal produces amplitude modulation of the light at the rf/microwave frequency. A wavelength-control signal 20 is applied to tunable filter 36 so as to change the central wavelength of signal 34 transmitted through filter 36 over a specific band of wavelengths (i.e., to move the passband). The filter bandpass is 1/10 or less of the total spectral band of source 32. The output from tunable filter 36 enters the single-mode, high dispersion optical fiber 14 and propagates therealong in time proportional to the wavelength of filtered signal 34'. The output from fiber 14 is received by the detector/converter unit 16, in the form of a conventional photodiode, wherein it is converted to an output electrical signal 24 time delayed by a specific amount in direct relation to the wavelength of signal 34'. In general, utilization of tunable filter 36 may limit the delay steps to perhaps 10 or 15 time delays depending upon the optical source 32 and the particular filter 36 utilized.

Figure 4:
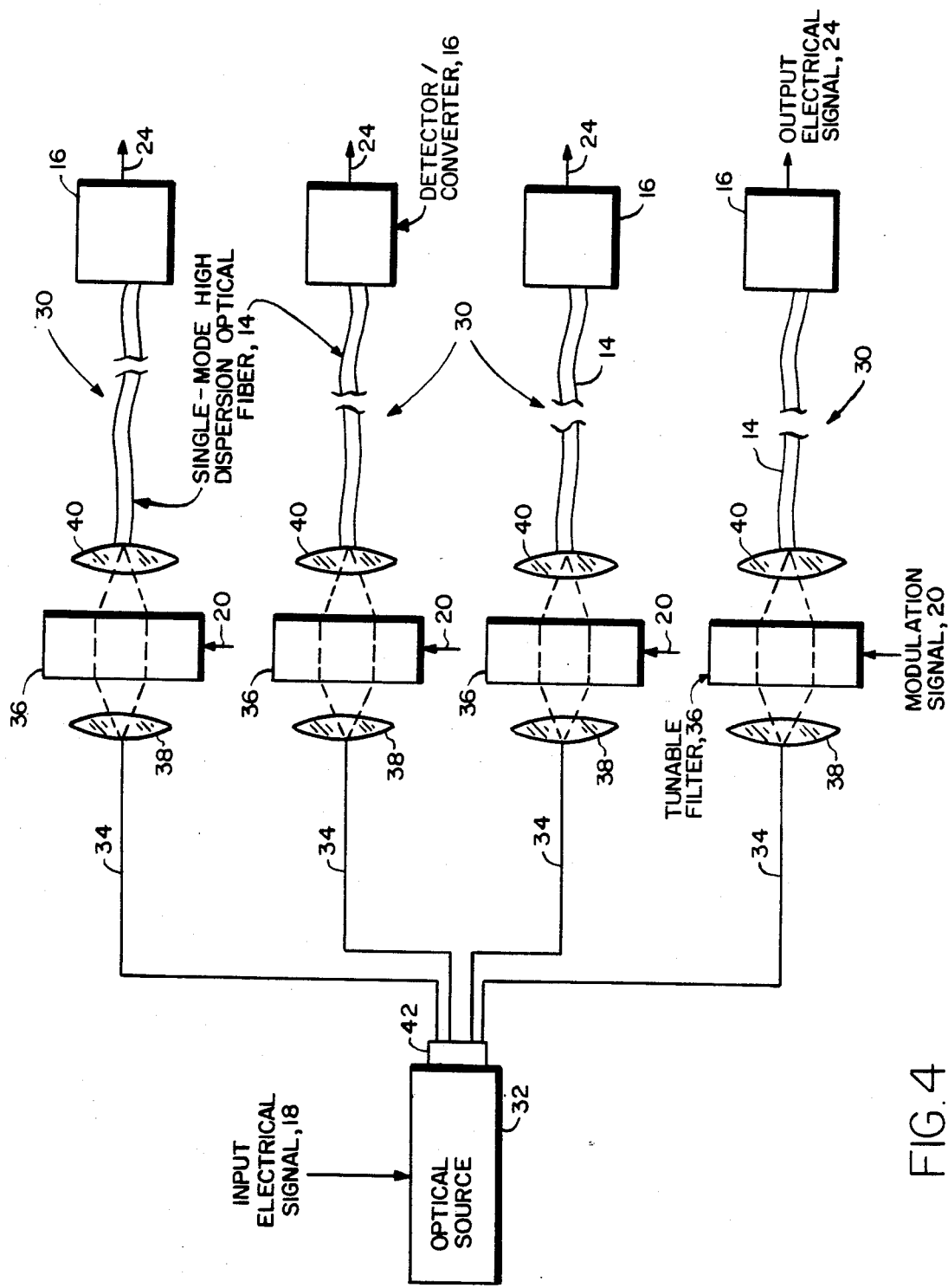
FIG. 4 is a schematic representation of a plurality of the alternate wavelength dependent tunable optical time delay systems of the present invention linked together in order produce a plurality of output signals.

In addition, as with system 10, a plurality of systems 30 may be connected in parallel to one another in the manner shown in FIG. 4 of the drawings. The advantage of the system as depicted in FIG. 4 of the drawings is that a single optical source 32 may be utilized with a plurality of tunable filters 36 so that the various electrical output signals 24 may be time delayed independently in accordance with the tuning of the various independent filters 36. As depicted in FIG. 4, one optical source 32 is utilized in conjunction with a optical power divider 42 which inputs this optical signal 34 into the plurality of tunable filters 36. As with the embodiment shown in FIG. 2 of the drawings all fibers 14 are of the same length.

Although this invention has been described with reference to particular embodiments, it will be understood that this invention is also capable of further and other embodiments within the spirit and scope of the appended claims. For example, it may be possible to increase the present number of wavelengths by either increasing the laser cavity length, decreasing the center lasing wavelength or by using different 3-5 semiconductor materials in the construction of the conversion/tuning unit 12, or by making the lengths of the two laser cavities unequal.

I claim:

1. A wavelength dependent, tunable, optical time delay system for electrical signals, said time delay system comprising:
   first means for receiving an electrical signal, for converting said electrical signal into an equivalent optical signal and for selectively varying the wavelength of said equivalent optical signal in response to a preselected electronic signal;
   second means, in the form of a single-mode, high dispersing optical fiber connected to said first means, for receiving said equivalent optical signal and for allowing said equivalent optical signal to propagate therethrough at a predetermined speed, said predetermined speed of propagation through said single-mode, high dispersion optical fiber being dependent upon said wavelength of said equivalent optical signal; and
   third means connected to said second means for receiving said equivalent optical signal propagating through said single-mode, high dispersion optical fiber and converting said equivalent optical signal back into an electrical signal which is output therefrom;
   whereby said electrical signal is time delayed in direct relation to said wavelength of said equivalent optical signal.

2. A wavelength dependent, tunable, optical time delay system as defined in claim 1 wherein said first means comprises a cleaved coupled cavity laser 3. A wavelength dependent, tunable, optical time delay system as defined in claim 2 wherein a separate electronic signal is input into said cleaved coupled cavity laser in order to vary said wavelength of said optical signal.

4. A wavelength dependent, tunable, optical time delay system as defined in claim 3 wherein said third means comprises a photodiode.

5. A wavelength dependent, tunable, optical time delay system as defined in claim 1, wherein said first means comprises a broad-band, quasi-coherent optical source optically coupled to a narrowband tunable filter.

6. A wavelength dependent, tunable, optical time delay system as defined in claim 5 wherein said optical source comprises a superluminescent diode.

7. A wavelength dependent, tunable, optical time delay system as defined in claim 6 wherein said first means further comprises a pair of collimating-and-refocusing lenses, respectively.

8. A wavelength dependent, tunable, optical time delay system as defined in claim 5 wherein a separate electronic signal is input into said tunable filter in order to vary said wavelength of said optical signal.

9. A wavelength dependent, tunable, optical time delay system as defined in claim 8 wherein said third means comprises a photodiode.

10. A wavelength dependent, tunable, optical time delay system for providing several distinct time delays to a single electrical signal, said time delay system comprising:
    first means for receiving said single electrical signal, for converting said electrical signal into a plurality of equivalent optical signals and for selectively varying the wavelength of said equivalent optical signals in response to a plurality of preselected electronic signals;
    a plurality of second means, in the form of single-mode, high dispersion optical fibers connected to said first means, for receiving said equivalent optical signals and for allowing said equivalent optical signals to propagate therethrough at predetermined speeds, said predetermined speeds of propagation through said single-mode, high dispersion optical fibers being dependent upon said wavelength of said equivalent optical signals; and
    a plurality of third means connected to said plurality of said second means for receiving said equivalent optical signals and converting said equivalent optical signals into a plurality of electrical signals which are output therefrom;
    whereby said electrical signals are time delayed in direct relation to said wavelength of said equivalent optical signals.

11. A wavelength dependent, tunable, optical time delay system as defined in claim 10 wherein said first means comprises a plurality of cleaved coupled cavity lasers.

12. A wavelength dependent, tunable, optical time delay system as defined in claim 11 wherein each of said third means comprises a photodiode.

13. A wavelength dependent, tunable, optical time delay system as defined in claim 10 wherein said first means comprises a single broad-band, quasi-coherent optical source, an optical power divider and a plurality of narrowband tunable filters.

14. A wavelength dependent, tunable, optical time delay system as defined in claim 13 wherein said optical source comprises a superluminescent diode.

15. A wavelength dependent, tunable, optical time delay system as defined in claim 14 wherein said first means further comprises a pair of collimating-and-refocusing lenses optically associated with each of said tunable filters.

16. A wavelength dependent, tunable, optical time delay system as defined in claim 15 wherein each of said third means comprises a photodiode.

* * * * *

UNITED STATES PATENT AND TRADEMARK OFFICE
CERTIFICATE OF CORRECTION

PATENT NO. : 4,671,604
DATED : June 9, 1987
INVENTOR(S) : Richard A. Soref

It is certified that error appears in the above-identified patent and that said Letters Patent is hereby corrected as shown below:

Claim 1, line 10, the word "dispersing" should read --dispersion--.

Signed and Sealed this

Fifteenth Day of December, 1987

Attest:

DONALD J. QUIGG

Attesting Officer   Commissioner of Patents and Trademarks